(12) United States Patent
Dickson et al.

(10) Patent No.: US 12,733,570 B2
(45) Date of Patent: Sep. 15, 2026

(54) AUTOMATIC CALIBRATION OF INDIVIDUAL WHEEL HUB MOTOR SPEED IN TRACTION SYSTEMS

(71) Applicants: Textron Inc., Providence, RI (US); Marlin Technologies, Inc., Horicon, WI (US)

(72) Inventors: William Christopher Dickson, Stowmarket (GB); Brian Richard Bertolasi, Waukesha, WI (US)

(73) Assignees: Textron Inc., Providence, RI (US); Marlin Technologies, Inc., Horicon, WI (US)

( * ) Notice: Subject to any disclaimer, the term of this patent is extended or adjusted under 35 U.S.C. 154(b) by 418 days.

(21) Appl. No.: 18/481,845

(22) Filed: Oct. 5, 2023

(65) Prior Publication Data

US 2025/0113768 A1 Apr. 10, 2025

(51) Int. Cl.

*A01D 34/00* (2006.01)
*A01D 34/44* (2006.01)
*A01D 69/02* (2006.01)
*A01D 101/00* (2006.01)

(52) U.S. Cl.

CPC ........... *A01D 34/006* (2013.01); *A01D 34/44* (2013.01); *A01D 69/02* (2013.01); *A01D 2101/00* (2013.01)

(58) Field of Classification Search

CPC ...... A01D 34/006; A01D 34/44; A01D 69/02; A01D 2101/00

See application file for complete search history.

(56) References Cited

U.S. PATENT DOCUMENTS 5,402,344 A 3/1995 Reister et al.
5,563,792 A 10/1996 Ander et al.
6,408,240 B1 6/2002 Morrell et al.
6,513,886 B1 * 2/2003 Weber .................... B60T 8/171 303/177
6,807,466 B2 10/2004 Strothmann
(Continued)

FOREIGN PATENT DOCUMENTS

CN 107199884 B 11/2019
CN 112537307 B 4/2022
(Continued)

OTHER PUBLICATIONS

English translation of WO2019174452A1 Vehicle Steering Control Method, Device, System, and Vehicle (Year: 2019).*

*Primary Examiner* — Joseph J Dallo
(74) *Attorney, Agent, or Firm* — Akona IP PC

(57) ABSTRACT

One embodiment is a control system for a vehicle comprising a plurality of wheels, the control system comprising a master control unit (MCU); a plurality of traction systems corresponding to the wheels; and a plurality of rolling radius offset values stored in a memory device of the MCU and each corresponding to one of the wheels. The MCU determines for each wheel a command speed based on the rolling radius offset value for the wheel in combination with a tire diameter of the wheel, a steered angle of the vehicle, a traction pedal command, and vehicle geometry information, and provides the determined command speed for the wheel to the corresponding traction system, which controls a speed of the wheel based on the determined command speed received from the MCU.

20 Claims, 6 Drawing Sheets

(56) References Cited

U.S. PATENT DOCUMENTS

| | | | | |
|---|---|---|---|---|
| 7,894,958 | B2 | 2/2011 | Tate et al. | |
| 7,942,228 | B2 | 5/2011 | Fenker et al. | |
| 8,275,532 | B2 | 9/2012 | Blaise et al. | |
| 8,306,699 | B2 | 11/2012 | Scheer | |
| 8,527,124 | B2 | 9/2013 | Velde et al. | |
| 8,527,125 | B2 | 9/2013 | Tate et al. | |
| 8,639,402 | B2 | 1/2014 | Tate et al. | |
| 8,645,011 | B2 | 2/2014 | Schaffler et al. | |
| 8,718,897 | B2 | 5/2014 | Wright et al. | |
| 9,065,304 | B2 | 6/2015 | Boughtwood | |
| 9,221,340 | B2 | 12/2015 | Byers et al. | |
| 9,421,883 | B2 | 8/2016 | Drako et al. | |
| 9,744,879 | B2 | 8/2017 | Drako | |
| 9,889,743 | B2 | 2/2018 | Ienaga | |
| 10,392,016 | B2 | 8/2019 | Gorczowski | |
| 10,556,592 | B2 | 2/2020 | Ienaga et al. | |
| 10,815,644 | B2 | 10/2020 | Fritz | |
| 10,821,981 | B1 | 11/2020 | Funke et al. | |
| 11,565,750 | B2 | 1/2023 | Chang et al. | |
| 11,607,952 | B1 | 3/2023 | Wright | |
| 2002/0019717 | A1 | 2/2002 | Uchida | |
| 2002/0153188 | A1 | 10/2002 | Brandt et al. | |
| 2005/0038588 | A1 | 2/2005 | Shukla | |
| 2005/0264245 | A1 | 12/2005 | Donnelly | |
| 2007/0295545 | A1 | 12/2007 | Romig et al. | |
| 2009/0192691 | A1 | 7/2009 | O'connor et al. | |
| 2012/0221222 | A1 | 8/2012 | Anderson et al. | |
| 2012/0279793 | A1 | 11/2012 | Kikuchi et al. | |
| 2016/0202147 | A1* | 7/2016 | Svantesson | G01M 17/02 702/189 |
| 2016/0236589 | A1 | 8/2016 | Sikand et al. | |
| 2018/0281603 | A1 | 10/2018 | Nordmann | |
| 2020/0356788 | A1* | 11/2020 | Joseph | G01B 11/26 |
| 2022/0144279 | A1 | 5/2022 | Arikere et al. | |
| 2022/0314816 | A1 | 10/2022 | Wang et al. | |
| 2022/0355855 | A1 | 11/2022 | Hanchett | |
| 2022/0410853 | A1 | 12/2022 | Henderson et al. | |
| 2023/0021908 | A1 | 1/2023 | Trainham | |
| 2023/0122499 | A1* | 4/2023 | Holeton | H02J 7/0048 320/109 |
| 2023/0320266 | A1* | 10/2023 | Yang | B60L 15/025 |
| 2023/0356788 | A1* | 11/2023 | Sandgren | B62D 35/001 |

FOREIGN PATENT DOCUMENTS

| | | | | |
|---|---|---|---|---|
| CN | 112498124 | B | 5/2022 | |
| CN | 114523983 | A | 5/2022 | |
| DE | 102013226592 | A1 | 6/2015 | |
| DE | 102015109461 | B4 | 5/2017 | |
| EP | 3722514 | A1 | 10/2020 | |
| JP | 4305781 | B2 | 7/2009 | |
| KR | 940005450 | A | 3/1994 | |
| WO | 2007096646 | A1 | 8/2007 | |
| WO | WO-2019174452 | A1 * | 9/2019 | B62D 6/00 |
| WO | 2022262937 | A1 | 12/2022 | |

* cited by examiner

AUTOMATIC CALIBRATION OF INDIVIDUAL WHEEL HUB MOTOR SPEED IN TRACTION SYSTEMS

TECHNICAL FIELD

This disclosure relates in general to the field of riding lawn mowers and other vehicles and, more particularly, though not exclusively, to techniques for performing automatic calibration of the speed of individual wheel hub motors in traction systems for such riding lawn mowers and other vehicles.

BACKGROUND

A riding lawn mower may include a traction system for controlling the speed of the mower wheels. An internal combustion engine may be employed to drive a variable displacement pump for generating oil flow in the mower traction system, such that oil is distributed to independent hydraulic motors for driving the wheels via a traction valve. In such hydraulic systems, fluid (i.e., oil) can flow freely through the traction system, such that the distribution of oil between the wheel motors continuously adjusts itself depending on the pressure at each wheel. As a result, the traction system continuously adjusts wheel speeds as necessary when the mower is cornering or in response to variations in wheel diameter.

BRIEF DESCRIPTION OF THE DRAWINGS

To provide a more complete understanding of the present disclosure and features and advantages thereof, reference is made to the following description, taken in conjunction with the accompanying figures, in which like reference numerals represent like elements.

DETAILED DESCRIPTION

Figure 1A:
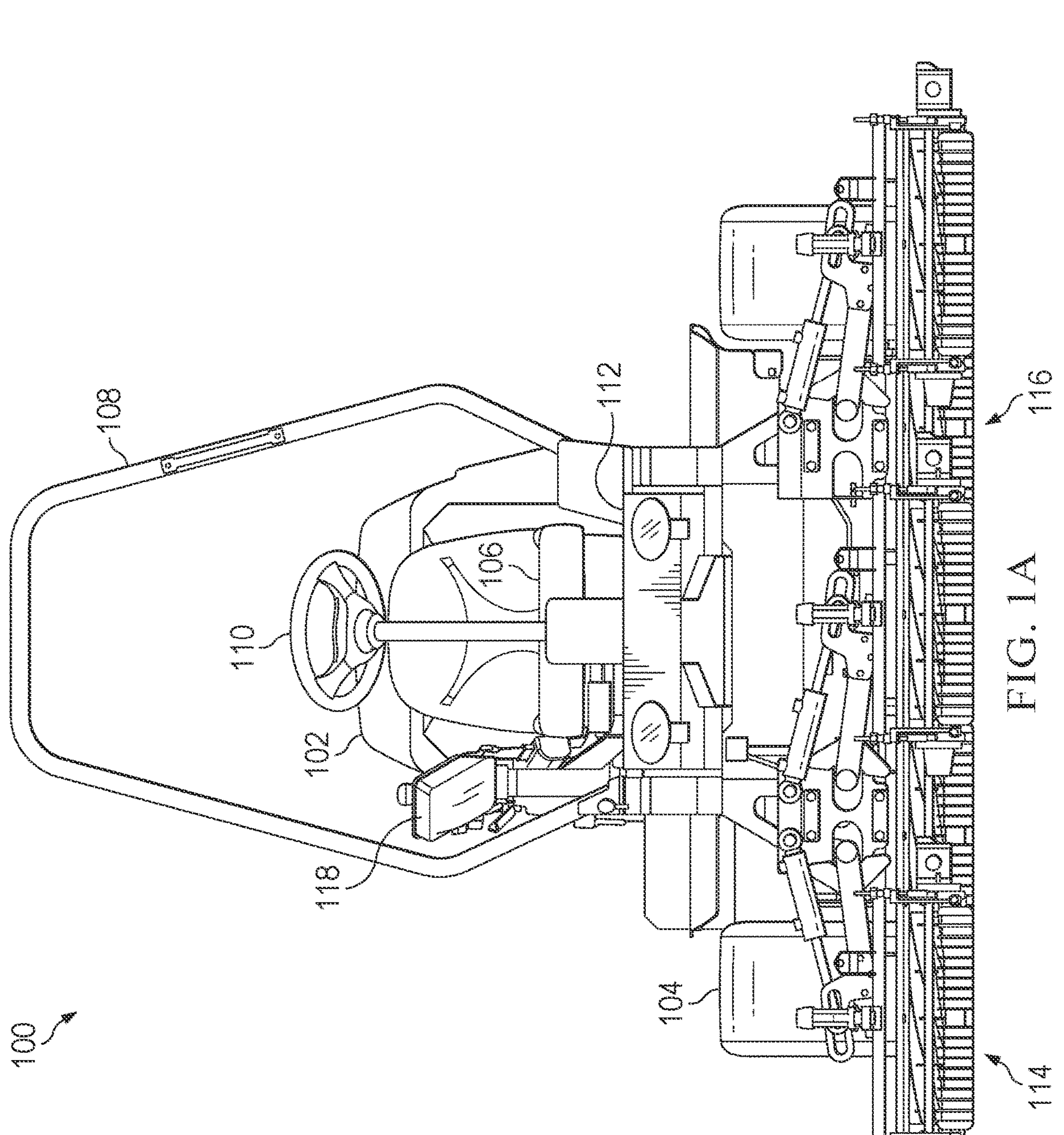
FIGS. 1A-1B illustrate an example lawn mower in which embodiments described herein for automatic calibration of wheel traction motor speed may be implemented.

The following disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiment, numerous implementation-specific decisions must be made to achieve the developer's specific goals, including compliance with system, business, and/or legal constraints, which may vary from one implementation to another. Moreover, it will be appreciated that, while such a development effort might be complex and time-consuming; it would nevertheless be a routine undertaking for those of ordinary skill in the art having the benefit of this disclosure.

In the specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above", "below", "upper", "lower", "top", "bottom", "raised", "lowered", or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction. When used to describe a range of dimensions or other characteristics (e.g., time, pressure, temperature, length, width, etc.) of an element, operations, and/or conditions, the phrase "between X and Y" represents a range that includes X and Y.

Additionally, as referred to herein in this specification, the terms "forward," "aft," "inboard," and "outboard" may be used to describe relative relationship(s) between components and/or spatial orientation of aspect(s) of a component or components. The term "forward" may refer to a spatial direction that is closer to a front of a vehicle relative to another component or component aspect(s). The term "aft" may refer to a spatial direction that is closer to a rear of a vehicle relative to another component or component aspect (s). The term "inboard" may refer to a location of a component that is within the fuselage of a vehicle and/or a spatial direction that is closer to or along a centerline of the vehicle (wherein the centerline runs between the front and the rear of the vehicle) or other point of reference relative to another component or component aspect. The term "outboard" may refer to a location of a component that is outside the fuselage of a vehicle and/or a spatial direction that is farther from the centerline of the vehicle or other point of reference relative to another component or component aspect.

Further, the present disclosure may repeat reference numerals and/or letters in the various examples. This repetition is for the purpose of simplicity and clarity and does not in itself dictate a relationship between the various embodiments and/or configurations discussed. Example embodiments that may be used to implement the features and functionality of this disclosure will now be described with more particular reference to the accompanying figures.

Figure 1B:
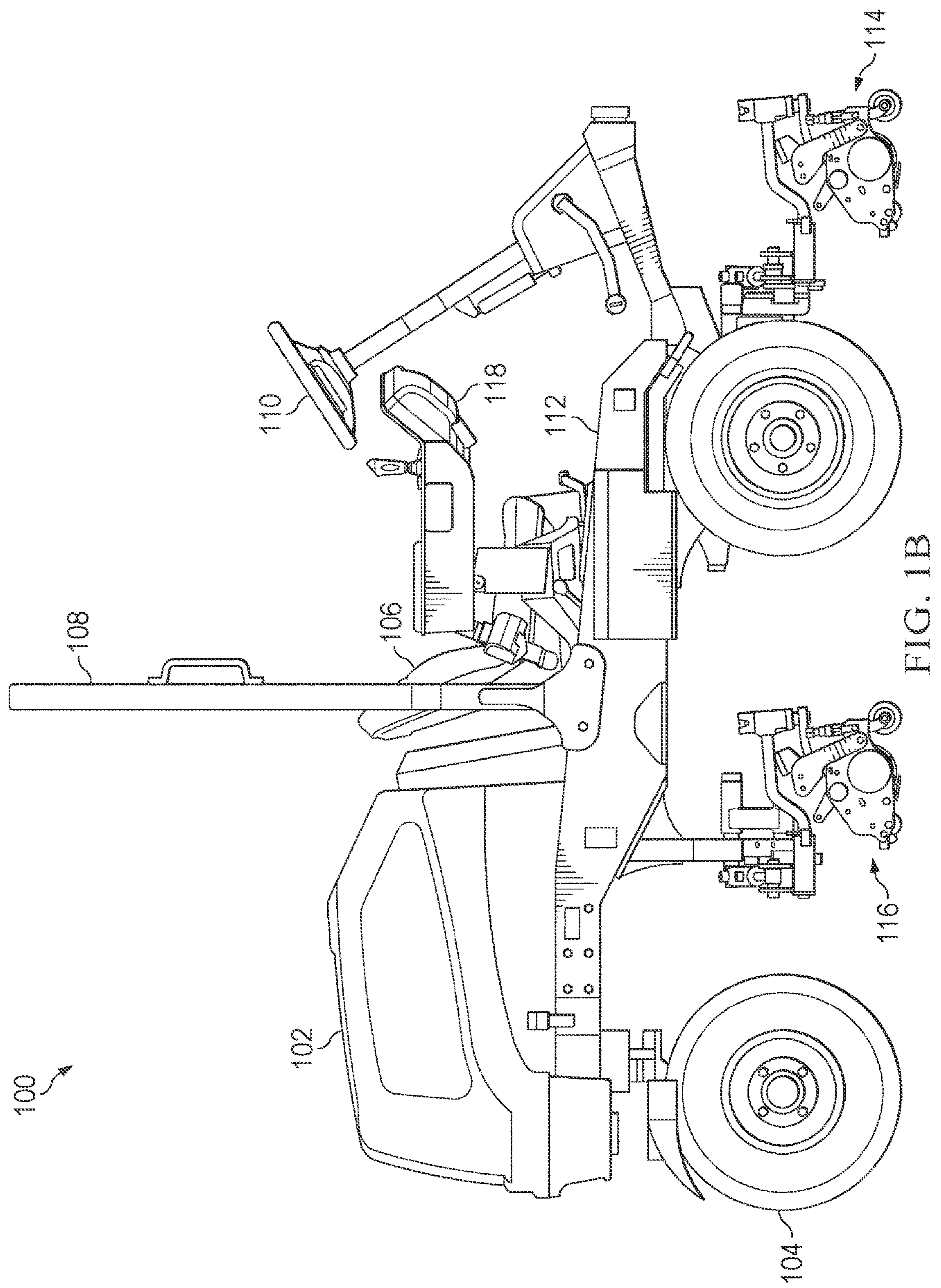

FIGS. 1A-1B respectively illustrate side and front plan views of an example embodiment of a vehicle comprising a lawn mower 100. It will be recognized that although particular embodiments are described herein with specific reference to lawn mowers, such as lawn mower 100, the embodiments may find application in a variety of other types of vehicles, such as golf carts, utility vehicles, and recreational vehicles, for example. As such, "mower" and "vehicle" may be used interchangeably herein.

In particular embodiments, lawn mower 100 may be used for mowing a golf course or other large area of grass or lawn. Lawn mower 100 may include an engine cover/hood 102, ground-engaging members, which in the illustrated embodiment are implemented as wheels 104 including tires installed thereon and/or associated therewith, a seat 106, a roll-over protection bar 108, a steering wheel 110, a foot-rest 112, forward cutting units, or cutting decks, 114 and rear cutting units, or cutting decks, 116. In the illustrated embodiment, mower 100 includes three wheels, including two front wheels and one rear wheel; however, it will recognized that different wheel configurations, including different numbers and positions of wheels, may be provided. In some embodiments, the front row may include three cutting decks 114 and the back row may include four cutting decks 116 (not all of which are visible in FIGS. 1A and 1B). In alternative embodiments, mower 100 may include more or fewer front and/or rear cutting decks. FIGS. 1A and 1B illustrate cutting units 114, 116, in a lowered position, in which cutting units are active for mowing grass growing on a surface on which mower 100 is transiting. A control panel 118 is also provided for enabling an operator (e.g., seated in seat 106) to control various modes of operations of mower 100 in accordance with features of embodiments described herein. In particular embodiments, control panel 118 may include one or more of a display unit including a graphical user interface (GUI) and a switch panel including one or more physical switches and/or joysticks, for example. Display unit may include a touchscreen and may be used to convey information to and/or receive information from an operator of mower 100. A traction pedal (not shown in FIG. 1) is provided and may be implemented as a foot pedal on an operator's platform, much like an accelerator pedal in an automobile. The pressure applied to the traction pedal by an operator's foot indicates the speed at which the operator intends the mower to operate. For example, when the traction pedal is fully depressed, the mower travels at 100% of its maximum speed.

In accordance with features of embodiments described herein, wheel hub assemblies for wheels 104 are implemented using electric traction motors, instead of hydraulic motors as deployed in previous lawn mowers. As a result, instead of wheel speeds being controlled by hydraulic fluid flowing freely through the traction system, an exact command speed must be given to each wheel motor dependent on a variety of operational factors, such as vehicle geometry, tire rolling radius, command speed, and steering angle. Fluctuation of the rolling radius of the tires (e.g., due to tire pressure and/or tire manufacturing tolerances) and/or the steering neutral position not being 100% true to the vehicle chassis will result in inaccurate command speeds being sent to the wheels.

In accordance with features of embodiments described herein, a speed control mode is utilized in connection with the electric motors. In speed control mode, the desired RPM is sent as a command and a traction system will hold each wheel at a commanded RPM. As a result, it is imperative the command speed provided to each such controller is accurate. If the command speeds are inaccurate for some reason, the wheel motors may work against one another such that one of them could be regenerating to try and slow down to reach its commanded speed while the others are driving to reach theirs, thereby reducing overall system efficiency and generating excess heat within the wheel motors.

In accordance with features of embodiments described herein, automatic calibration techniques are provided to enable the traction system to accommodate differences in the rolling radius and steered neutral position of the mower dynamically. In one embodiment, a calibration mode may be entered by the mower when a set of predetermined operational conditions are met. In the calibration mode, traction motor currents are monitored and compared against a live rolling average current of all traction motors within the system and a rolling radius offset value is generated for each motor/wheel. The rolling radius offset values are stored in the system and used to adjust the command speed provided to each motor/wheel. Calibration mode may be entered each time the set of predetermined operational conditions are met, resulting in a system in which rolling radius offset values are periodically generated for each wheel, thereby ensuring maximum traction system efficiency.

Figure 2:
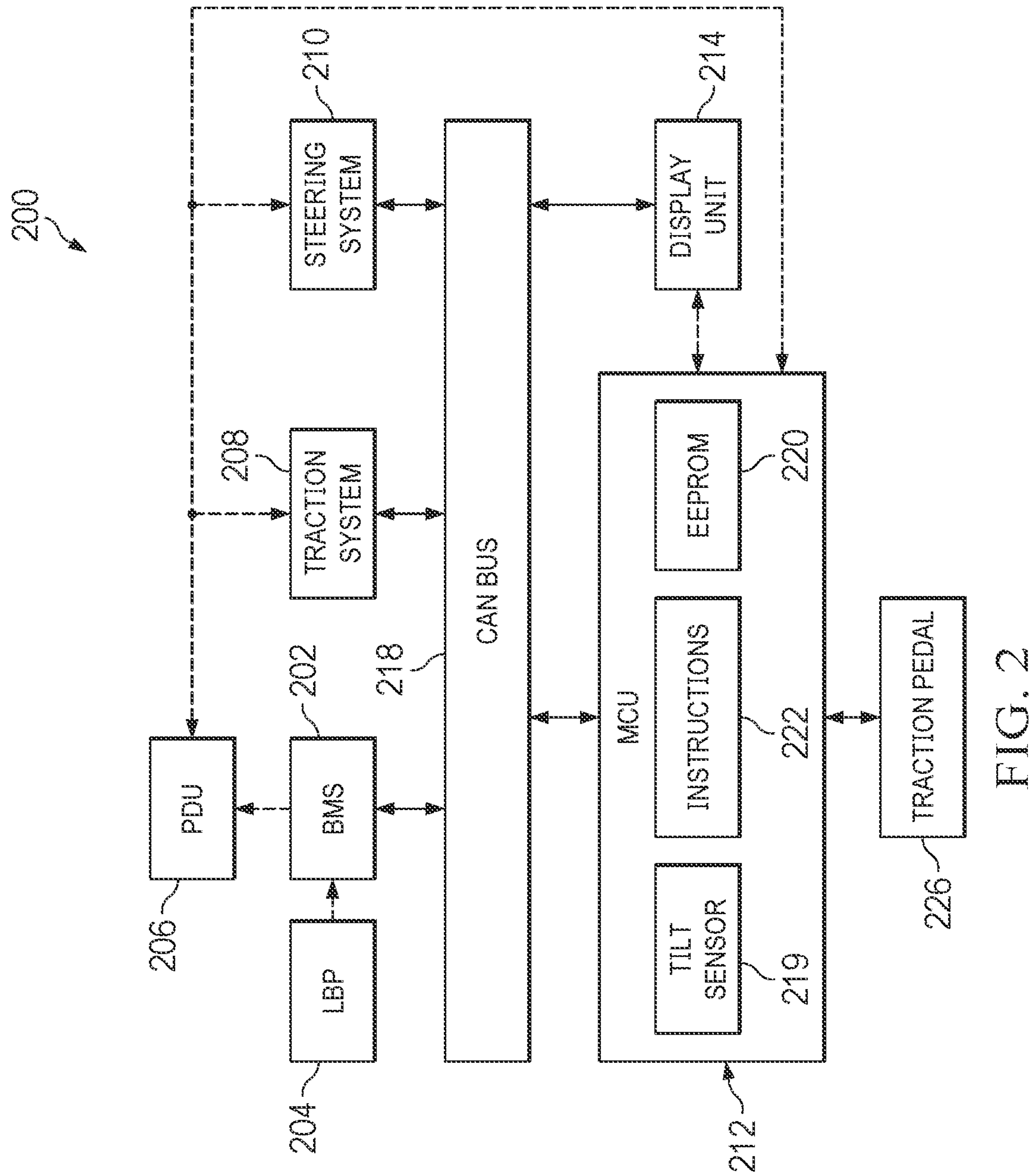
FIG. 2 illustrates an example system block diagram of a lawn mower control system according to features of embodiments described herein for automatic calibration of wheel traction motor speed.

Referring now to FIG. 2, illustrated therein is a block diagram of an example control system 200 for a lawn mower, such as mower 100 (FIGS. 1A and 1B). It will be recognized that in FIG. 2 dashed arrows represent power flow, whereas solid arrows represent communications flow. In accordance with features of embodiments described herein, upon ignition or power on condition of a mower, assuming specified safety considerations are satisfied, a battery management system (BMS) 202 may distribute power from a power source, such as a lithium battery pack (LBP) 204 (which in some embodiments may be a 48 volt DC LPB) to a power distribution unit (PDU) 206. PDU 206 may distribute power to one or more of traction system 208, a steering system 210, a master control unit (MCU) 212, and a display unit 214, all of which are interconnected via a controller area network (CAN) bus 218.

Figure 5:
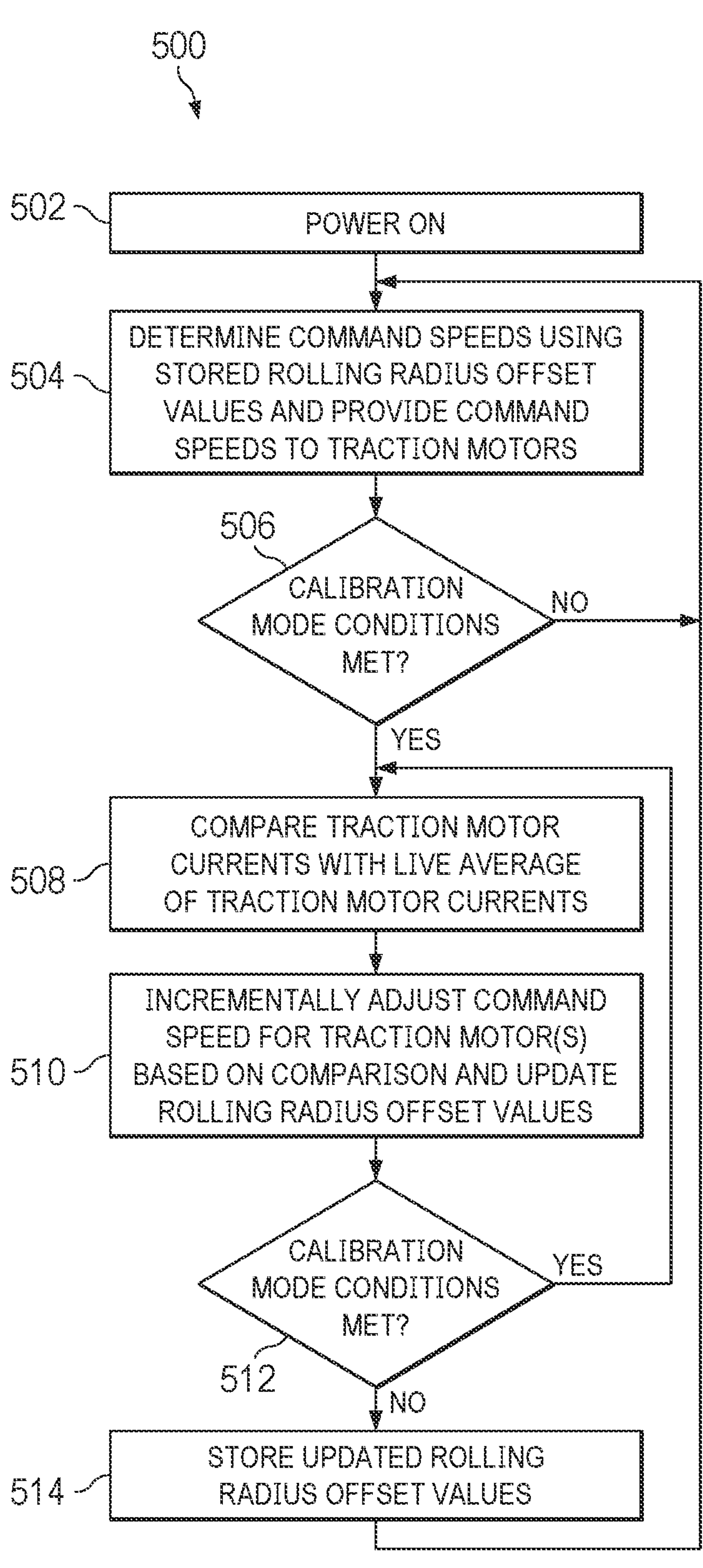
FIG. 5 is a flowchart illustrating example operations performed by a lawn mower control system of FIG. 2 for automatic calibration of wheel traction motor speed according to features of embodiments described herein.

MCU 212 may include a tilt sensor 219, a non-volatile memory device, such as an EEPROM 220, for storing various values for use in operation of the mower, as well as an instruction module 222 for storing instructions executable by MCU 212 for implementing operations described herein for automatic calibration of wheel traction motor speed (e.g., in FIG. 5). A signal from a traction pedal 226 is generated in response to depression of the traction pedal as discussed above with reference to FIG. 1 and is indicative of a speed corresponding to the amount of depression. The signal from traction pedal 226 is provided to MCU 212, which processes the value indicated by the signal in combination with the steering angle and calculates an RPM for each wheel based on vehicle geometry.

Figure 3:
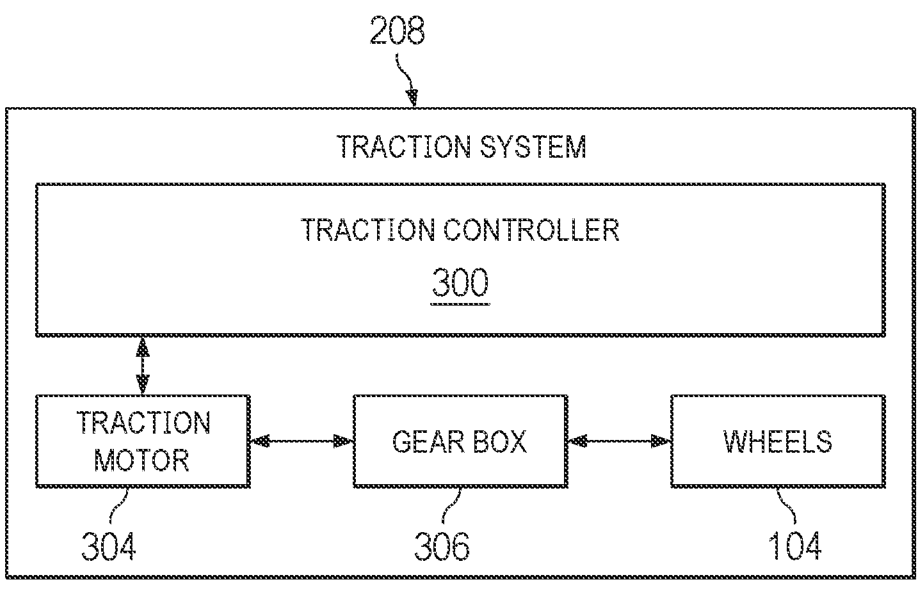
FIG. 3 illustrates an example system block diagram of a traction system of the lawn mower control system of FIG. 2 according to features of embodiments described herein for automatic calibration of wheel traction motor speed.

As shown in FIG. 3, traction system 208 includes for each wheel 104 a traction controller 302 and an electric traction motor 304 for controlling operation of a gear box 306 connected to the wheel. In particular embodiments, traction system 208 includes a traction control unit, or traction controller, 300 and corresponding traction motor 304 for each wheel 104. Alternatively, a single traction controller 300 may be provided for controlling operation of multiple traction motors 304. Each traction controller 300 may control a speed of corresponding wheel 104 by controlling the speed of the corresponding traction motor 304 in response to a command speed received from MCU 212 (FIG. 2). As will be described in detail hereinbelow, the command speed received from MCU 212 for a particular traction motor 304 may be adjusted by applying a stored rolling radius offset value corresponding to the traction motor 304.

Figure 4:
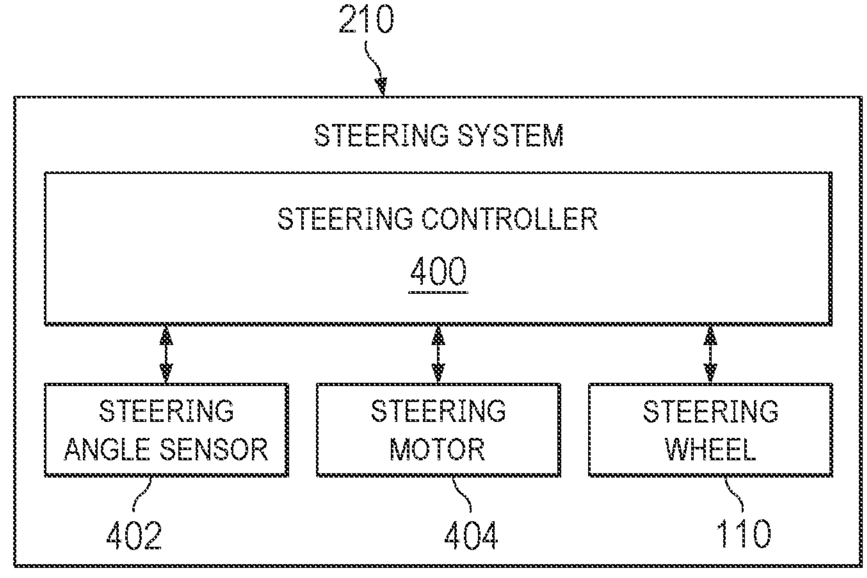
FIG. 4 illustrates an example system block diagram of a steering system of the lawn mower control system of FIG. 2 according to features of embodiments described herein for automatic calibration of wheel traction motor speed.

As shown in FIG. 4, steering system 210 includes a steering controller 400, a steering angle sensor 402, a steering motor 404, and steering wheel 110. Steering control unit 402 receives inputs from steering wheel 110, steering angle sensor 402, and steering motor 404 to control the steered angle of rear wheel (or wheels) 104. Steering control unit 400 reports the steered angle of each of the wheels 104 to MCU 212 via CAN bus 218.

Referring to FIGS. 2-4 collectively, in operation, MCU 212 controls speed, acceleration, deceleration, and current limit of traction motors 304 via appropriate signals to control units 302 via CAN bus 218 and traction motors 304 report back to MCU 212 via CAN bus 218 a variety of parameters, such as actual traction motor speed, actual traction motor current, traction control unit temperature, and error state, for example.

In various embodiments, control system 200 may include more, fewer, or other components than shown in FIG. 2. For example, control system 200 may further include additional processors, input/output (I/O) devices, communications links, and memory. Control system 200 may be operable to perform one or more operations of various embodiments as described herein. Although the embodiment shown provides one example of control system 200 that may be used with other embodiments, such other embodiments may utilize control systems other than control system 200. Additionally, embodiments may also employ multiple control systems, such as control system 200. Control system 200 may exist wholly or partially on-board the mower, off-board the mower (e.g., in a ground station), or a combination of the two.

MCU 212 may be implemented as a processor or other device operable to execute logic contained within a medium. Examples of such devices include one or more microprocessors, one or more applications, and/or other logic. Control system 200 may include one or multiple such devices. Control system 200 may include input/output devices including any device or interface operable to enable communication between control system 200 and external components, including communication with an operator or another system. Example input/output devices may include, but are not limited to, a mouse, keyboard, display, and printer.

Network interfaces may be provided to facilitate communication between control system 200 and another element of a network, such as other computer systems. Network interfaces may connect to any number and combination of wireline and/or wireless networks suitable for data transmission, including transmission of communications. Network interfaces may, for example, communicate audio and/or video signals, messages, internet protocol packets, frame relay frames, asynchronous transfer mode cells, and/or other suitable data between network addresses. Network interfaces connect to a computer network or a variety of other communicative platforms including, but not limited to, a public switched telephone network (PSTN); a public or private data network; one or more intranets; a local area network (LAN); a metropolitan area network (MAN); a wide area network (WAN); a wireline or wireless network; a local, regional, or global communication network; an optical network; a satellite network; a cellular network; an enterprise intranet; all or a portion of the Internet; other suitable network interfaces; or any combination of the preceding.

Control system 200 may include additional memory devices comprising any suitable storage mechanism which may store any data for use by control system 200. Memory may comprise one or more tangible, computer readable, and/or computer-executable storage medium. Examples of memory include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or other computer-readable medium.

In some embodiments, memory stores logic for facilitating operation of control system 200. Logic may include hardware, software, and/or other logic and may be encoded in one or more tangible, non-transitory media and may perform operations when executed by a computer. Logic may include a computer program, software, computer executable instructions, and/or instructions capable of being executed by control system 200. Example logic may include any of the well-known OS2, UNIX, Mac-OS, Linux, and Windows Operating Systems or other operating systems. In particular embodiments, the operations of the embodiments may be performed by one or more computer readable media storing, embodied with, and/or encoded with a computer program and/or having a stored and/or an encoded computer program. Logic may also be embedded within any other suitable medium without departing from the scope of the invention.

In accordance with features of embodiments described herein, rolling radius offset values for use in adjusting command speeds provided to traction motors 304 may be stored in EEPROM 220. During operation of the mower, when certain predetermined operational conditions (which may be referred to herein as "calibration conditions") are met, the mower may enter a calibration mode in which the rolling radius offset values may be updated as described below. When one or more of the calibration conditions are no longer met, the mower may exit calibration mode and the current rolling radius offset values are stored in the EEPROM in place of the previously stored rolling radius offset values. It will be noted that initial factory settings of the mower may include setting of rolling radius offset values to a default value (e.g., zero).

FIG. 5 is a flowchart 500 illustrating example operations for enabling automatic calibration of wheel traction motor speed according to features of embodiments described herein. In certain embodiments, one or more of the operations illustrated in FIG. 5 may be executed by one or more of the elements shown in FIG. 2, such as MCU 212, for example.

Execution begins at operation 502 when the mower, or vehicle, is powered on.

At operation 504, individual command speeds for each traction motor/wheel may be determined using stored rolling radius offset values, which may be scaled and applied to wheel tire diameter information (which may also be stored in EEPROM 220, for example), along with other input, including such as actual steered angle reported by the steering system (e.g., steering system 210) and stored vehicle geometry information. The individual command speeds may be provided to the traction motors for controlling the speed of the wheels. As will be described in greater detail below, the rolling radius offset value for each wheel may be adjusted during the calibration process such that a different rolling radius offset may be applied to each wheel (thereby effectively adjusting the applied size of the wheel in operation).

At operation 506, a determination may be made whether a set of calibration mode conditions have been met. In particular embodiments, calibration mode conditions may include (1) whether the mower is driving at a consistent command speed in excess of a minimum threshold speed (e.g., 6 miles per hour (MPH)); (2) whether the vehicle is driving in a substantially straight line (e.g., steering angle within +/−1.5 degrees of neutral); (3) whether the vehicle is driving on a substantially level (or flat) surface (e.g., tilt angle within +/−3 degrees of neutral); and (4) whether the traction motor currents are within a reasonable range for driving on a substantially level surface. If one or more of the calibration conditions are not met, a negative determination is made at operation 506 and execution returns to operation 504.

Figure 6:
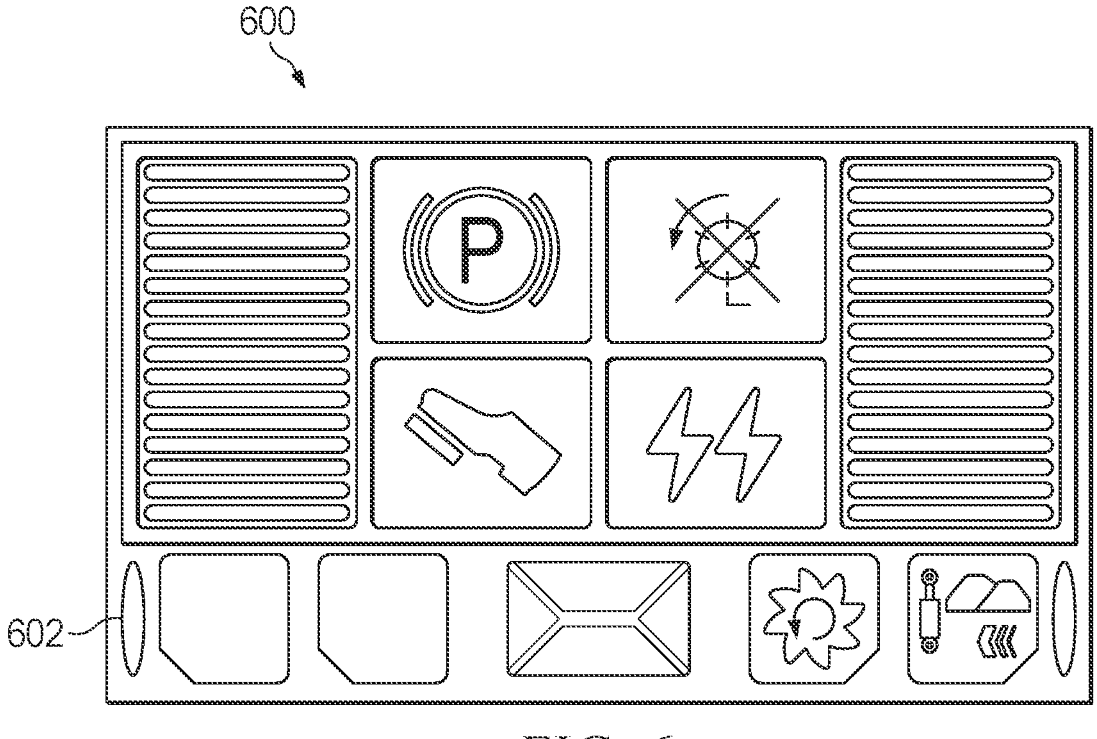
FIG. 6 illustrates an example user interface of the lawn mower of FIGS. 1A and 1B according to features of embodiments described herein for automatic calibration of wheel traction motor speed.

If at operation 506, all of the calibration conditions are met, the system enters calibration mode and execution proceeds to operation 508. Referring briefly to FIG. 6, illustrated therein is an example graphical user interface (GUI) 600 of display unit 218 for use in configuring and controlling various operational aspects of a mower, such as mower 100. In accordance with features of embodiments described herein, GUI 600 may include indicators 602, which may comprise light emitting diodes (LEDs) or other light elements, that are illuminated to alert an operator when the system is in calibration mode.

Referring again to FIG. 5, at operation 508, the actual current for each traction motor ("actual current") may be compared against a live average of all of the traction motor currents ("live average current"). In some embodiments, a difference between the live average current and the actual current may be calculated for each wheel. In some embodiments, the calculated difference may be divided by a scale factor, resulting in a scaled difference.

At operation 510, the command speed for each traction motor having a current higher or lower than the average may be incrementally adjusted in an attempt to equalize the traction motor currents. In particular, a higher than average traction motor current may indicate that the command speed of the corresponding wheel is too high and should be decreased. Similarly, a lower than average traction motor current may indicate that the command speed of the corresponding wheel is too low and should be increased. Additionally at operation 510, rolling radius offset values may be updated based on the incremental adjustments to the command speeds.

In some embodiments, portions of operations 508 and 510 may be implemented by subtracting the scaled difference for each wheel from AutoDiff factor for the wheel (which may be originally set to 0 for each wheel) to create an updated AutoDiff factor. The value of the AutoDiff factor may be bounded between −X and X, with any negative values treated as 0. The updated AutoDiff factor may be further scaled, with the scaled result being deemed the rolling radius offset value. For each wheel, the current wheel size (which is initially set to a default value) may be adjusted using the rolling radius offset value for the wheel, resulting in an adjusted wheel size that may be subsequently used as the current wheel size for the wheel. A working example of the foregoing operations is illustrated in Table 1 below:

At operation 512, a determination is made whether the calibration conditions continue to be met. If a positive determination is made at operation 512, execution returns to operation 508 and the process is repeated. It will be recognized that in particular embodiments, the process may be reinitiated only after a predetermined period of time (e.g. 10 ms) has elapsed since the previous time the process was initiated. If a negative determination is made at operation 512, execution proceeds to operation 514.

At operation 514, the current rolling radius offset values (e.g., resulting from the most recent iteration of operation 510) continue to be applied and execution returns to step 506.

In the above-described manner, the command speeds continue to be optimized (through continuous calibration of the rolling radius offset values) throughout operation of the mower. When the mower is shut down, or powered off, the current rolling radius offset values (e.g., the current rolling radius offset values from the most recent iteration of operation 514) are stored in the EEPROM in place of the previously stored values.

The continual calibration enables compensation for variance within the traction and steering system (which may be cause by a variety of factors) to provide maximum operational efficiency, while allowing the vehicle to operate in speed control mode, which enables each wheel to spin at the correct speed regardless of grip. The result is a permanent all-wheel drive (AWD) solution for all steering angles and command speeds.

Although the operations of the example method shown in and described with reference to FIG. 5 are illustrated as occurring once each and in a particular order, it will be recognized that the operations may be performed in any suitable order and repeated as desired. Additionally, one or more operations may be performed in parallel. Furthermore, the operations illustrated in FIG. 5 may be combined or may include more or fewer details than described.

Example 1 provides a control system for a vehicle comprising a plurality of wheels, the control system comprising a master control unit (MCU); a plurality of traction systems, wherein each of the traction systems corresponds to one of the wheels; and a plurality of rolling radius offset values stored in a memory device accessible by the MCU, wherein each of the rolling radius offset values corresponds to one of the wheels; wherein the MCU determines for each one of the wheels a command speed based on the rolling radius offset value corresponding to the one of the wheels in combination with at least one of a tire diameter of the one of the wheels, a steered angle of the vehicle, a traction pedal command, and vehicle geometry information, and provides the determined command speed for the one of the wheels to the traction system corresponding to the one of the wheels; and wherein

TABLE 1

| | | CURRENT | INTIAL AUTODIFF FACTOR | UPDATED AUTODIFF FACTOR | CORRECTION FACTOR | APPLIED WHEEL DIAMETER |
|---|---|---|---|---|---|---|
| | FL WHEEL | 10 A | 0 | −10 | 0 | 520 |
| 1ST LOOP | FR WHEEL | 20 A | 0 | 0 | 0 | 520 |
| | REAR WHEEL | 30 A | 0 | 10 | 0 | 520 |
| | LIVE AVERAGE | 20 A | | | | |
| | FL WHEEL | 10 A | −10 | −20 | 0 | 520 |
| 2ND LOOP | FR WHEEL | 20 A | 0 | 0 | 0 | 520 |
| | REAR WHEEL | 30 A | 10 | 20 | 1 | 521 |
| | LIVE AVERAGE | 20 A | | | | |

each of the traction systems controls a speed of the corresponding one of the wheels based on the determined command speed for the one of the wheels received from the MCU.

Example 2 provides the control system of example 1, wherein each of the traction systems comprises a traction motor for providing rotational force to the corresponding one of the wheels, wherein the traction motor comprises an electric motor; and a traction control unit (TCU) for controlling a speed of the rotational force generated by the traction motor.

Example 3 provides the control system of example 2, further comprising a traction pedal for indicating a desired speed for the vehicle.

Example 4 provides the control system of example 1, wherein during operation of the vehicle, the MCU determines whether a set of calibration mode conditions has been met and if so, causes the vehicle to operate in a calibration mode.

Example 5 provides the control system of example 4, wherein the set of calibration mode conditions includes at least one of whether the mower is driving at a consistent command speed in excess of a minimum threshold speed; whether the vehicle is driving in a substantially straight line; whether the vehicle is driving on a substantially level surface; and whether traction motor currents are within a reasonable range for driving on a substantially level surface.

Example 6 provides the control system of example 4, wherein operating in the calibration mode comprises, for each of the traction systems, comparing a traction motor current for the traction system with an average traction motor current for all of the traction systems; and based on results of the comparing, adjusting the command speed corresponding to the one of the wheels.

Example 7 provides the control system of example 6, wherein operating in calibration mode further comprises, based on results of the comparing, updating the rolling radius offset value corresponding to the one of the wheels.

Example 8 provides the control system of example 6, wherein the MCU determines for each one of the wheels an updated command speed based on the updated rolling radius offset value corresponding to the one of the wheels in combination with at least one of a tire diameter of the one of the wheels, a steered angle of the vehicle, a traction pedal command, and vehicle geometry information, and provides the determined updated command speed for the one of the wheels to the traction system corresponding to the one of the wheels.

Example 9 provides the control system of example 6, wherein the plurality of rolling radius offset values stored in the memory device are replaced with the updated rolling radius offset values when the vehicle ceases operation.

Example 10 provides a vehicle comprising a plurality of wheels; a master control unit (MCU); a plurality of traction systems, wherein each of the traction systems corresponds to one of the wheels; and a plurality of rolling radius offset values stored in a memory device accessible by the MCU, wherein each of the rolling radius offset values corresponds to one of the wheels; wherein the MCU determines for each one of the wheels a command speed based on the rolling radius offset value corresponding to the one of the wheels in combination with at least one of a tire diameter of the one of the wheels, a steered angle of the vehicle, a traction pedal command, and vehicle geometry information, and provides the determined command speed for the one of the wheels to the traction system corresponding to the one of the wheels; and wherein each of the traction systems controls a speed of the corresponding one of the wheels based on the determined command speed for the one of the wheels received from the MCU.

Example 11 provides the vehicle of example 10, wherein each of the traction systems comprises a traction motor for providing rotational force to the corresponding one of the wheels, wherein the traction motor comprises an electric motor; and a traction control unit (TCU) for controlling a speed of the rotational force generated by the traction motor.

Example 12 provides the vehicle of example 11, wherein the MCU determines whether a set of calibration mode conditions has been met and if so, causes the vehicle to operate in a calibration mode.

Example 13 provides the vehicle of example 12, wherein the operating in the calibration mode comprises for each of the traction systems, comparing a traction motor current for the traction system with an average traction motor current for all of the traction systems; and, based on results of the comparing, adjusting the command speed corresponding to the one of the wheels; and updating the rolling radius offset value corresponding to the one of the wheels.

Example 14 provides the vehicle of example 13, wherein the MCU determines for each one of the wheels an updated command speed based on the updated rolling radius offset value corresponding to the one of the wheels in combination with at least one of a tire diameter of the one of the wheels, a steered angle of the vehicle, a traction pedal command, and vehicle geometry information, and provides the determined updated command speed for the one of the wheels to the traction system corresponding to the one of the wheels.

Example 15 provides the vehicle of example 10, wherein the vehicle comprises a riding lawn mower.

Example 16 provides a computer-implemented method comprising determining for each of a plurality of wheels of a vehicle a command speed based on a rolling radius offset value corresponding to the wheel in combination with at least one of a tire diameter of the one of the wheels, a steered angle of the vehicle, a traction pedal command, and vehicle geometry information, wherein the rolling radius offset values are stored in a non-volatile memory device; for each of the determined command speeds, providing the determined command speed to a traction system for the corresponding wheel, wherein the traction system controls a speed of the corresponding wheel in accordance with the received command speed for the corresponding the wheel; determining whether a set of calibration mode conditions has been met; and if the set of calibration mode conditions has been met, causing the vehicle to operate in a calibration mode.

Example 17 provides the computer-implemented method of example 16, wherein the set of calibration mode conditions includes at least one of the mower driving at a consistent command speed in excess of a minimum threshold speed; the vehicle driving in a substantially straight line; the vehicle driving on a substantially level surface; and traction motor currents are within a reasonable range for driving on a substantially level surface.

Example 18 provides the computer-implemented method of example 16, wherein causing the vehicle to operate in the calibration mode comprises for each of the traction systems, comparing a traction motor current for the traction system with an average traction motor current for all of the traction systems; based on results of the comparing, adjusting the command speed of the corresponding wheel; and based on results of the comparing, updating the rolling radius offset value of the corresponding wheel.

Example 19 provides the computer-implemented method of example 18, further comprising determining for each of the wheels an updated command speed based on the updated rolling radius offset value corresponding to the wheel in combination with at least one of a tire diameter of the wheel, a steered angle of the vehicle, a traction pedal command, and vehicle geometry information, and provides the determined updated command speed for the wheel to the traction system corresponding to the wheel.

Example 20 provides the computer-implemented method of example 18, further comprising replacing the plurality of rolling radius offset values stored in the persistent memory device with the updated rolling radius offset values.

At least one representative embodiment is disclosed, and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, RI, and an upper limit, Ru, is disclosed, any number falling within the range is specifically disclosed. In particular, the following numbers within the range are specifically disclosed: R=RI+k*(Ru−RI), wherein k is a variable ranging from 1 percent to 100 percent with a 1 percent increment, i.e., k is 1 percent, 2 percent, 3 percent, 4 percent, 5 percent . . . 50 percent, 51 percent, 52 percent . . . , 95 percent, 96 percent, 95 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention. Also, the phrases "at least one of A, B, and C" and "A and/or B and/or C" should each be interpreted to include only A, only B, only C, or any combination of A, B, and C. The terms "substantially," "close," "approximately," "near," and "about," generally refer to being within +/−5-20% of a target value based on the context of a particular value as described herein or as known in the art. Similarly, terms indicating orientation of various elements, e.g., "coplanar," "perpendicular," "orthogonal," "parallel," or any other angle between the elements, generally refer to being within +/−5-20% of a target value based on the context of a particular value as described herein or as known in the art.

The diagrams in the FIGURES illustrate the architecture, functionality, and/or operation of possible implementations of various embodiments of the present disclosure. Although several embodiments have been illustrated and described in detail, numerous other changes, substitutions, variations, alterations, and/or modifications are possible without departing from the spirit and scope of the present disclosure, as defined by the appended claims. The particular embodiments described herein are illustrative only and may be modified and practiced in different but equivalent manners, as would be apparent to those of ordinary skill in the art having the benefit of the teachings herein. Those of ordinary skill in the art would appreciate that the present disclosure may be readily used as a basis for designing or modifying other embodiments for carrying out the same purposes and/or achieving the same advantages of the embodiments introduced herein. For example, certain embodiments may be implemented using more, less, and/or other components than those described herein. Moreover, in certain embodiments, some components may be implemented separately, consolidated into one or more integrated components, and/or omitted. Similarly, methods associated with certain embodiments may be implemented using more, less, and/or other steps than those described herein, and their steps may be performed in any suitable order.

Numerous other changes, substitutions, variations, alterations, and modifications may be ascertained to one of ordinary skill in the art and it is intended that the present disclosure encompass all such changes, substitutions, variations, alterations, and modifications as falling within the scope of the appended claims.

One or more advantages mentioned herein do not in any way suggest that any one of the embodiments described herein necessarily provides all the described advantages or that all the embodiments of the present disclosure necessarily provide any one of the described advantages. Note that in this specification, references to various features included in "one embodiment", "example embodiment", "an embodiment", "another embodiment", "certain embodiments", "some embodiments", "various embodiments", "other embodiments", "alternative embodiment", and the like are intended to mean that any such features are included in one or more embodiments of the present disclosure but may or may not necessarily be combined in the same embodiments.

As used herein, unless expressly stated to the contrary, use of the phrase "at least one of," "one or more of" and "and/or" are open ended expressions that are both conjunctive and disjunctive in operation for any combination of named elements, conditions, or activities. For example, each of the expressions "at least one of X, Y and Z", "at least one of X, Y or Z", "one or more of X, Y and Z", "one or more of X, Y or Z" and "A, B and/or C" can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z. Additionally, unless expressly stated to the contrary, the terms "first," "second," "third," etc., are intended to distinguish the particular nouns (e.g., blade, rotor, element, device, condition, module, activity, operation, etc.) they modify. Unless expressly stated to the contrary, the use of these terms is not intended to indicate any type of order, rank, importance, temporal sequence, or hierarchy of the modified noun. For example, "first X" and "second X" are intended to designate two X elements that are not necessarily limited by any order, rank, importance, temporal sequence, or hierarchy of the two elements. As referred to herein, "at least one of," "one or more of," and the like can be represented using the "(s)" nomenclature (e.g., one or more element(s)).

In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph (f) of 35 U.S.C. Section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A control system for a vehicle comprising a plurality of wheels, the control system comprising:

a master control unit (MCU);

a plurality of traction systems, wherein each of the traction systems corresponds to one of the wheels; and a plurality of rolling radius offset values stored in a memory device accessible by the MCU, wherein each of the rolling radius offset values corresponds to one of the wheels;

wherein the MCU determines for each one of the wheels a command speed based on the rolling radius offset value corresponding to the one of the wheels in combination with at least one of a tire diameter of the one of the wheels, a steered angle of the vehicle, a traction pedal command, and vehicle geometry information, and provides the determined command speed for the one of the wheels to the traction system corresponding to the one of the wheels; and wherein each of the traction systems controls a speed of the corresponding one of the wheels based on the determined command speed for the one of the wheels received from the MCU.

2. The control system of claim 1, wherein each of the traction systems comprises:

a traction motor for providing rotational force to the corresponding one of the wheels, wherein the traction motor comprises an electric motor; and a traction control unit (TCU) for controlling a speed of the rotational force generated by the traction motor.

3. The control system of claim 2, further comprising a traction pedal for indicating a desired speed for the vehicle.

4. The control system of claim 1, wherein during operation of the vehicle, the MCU determines whether a set of calibration mode conditions has been met and if so, causes the vehicle to operate in a calibration mode.

5. The control system of claim 4, wherein the set of calibration mode conditions includes at least one of:

whether the vehicle is driving at a consistent command speed in excess of a minimum threshold speed;

whether the vehicle is driving in a substantially straight line;

whether the vehicle is driving on a substantially level surface; and whether traction motor currents are within a predetermined range for driving on a substantially level surface.

6. The control system of claim 4, wherein operating in the calibration mode comprises:

for each of the traction systems, comparing a traction motor current for the traction system with an average traction motor current for all of the traction systems; and based on results of the comparing, adjusting the command speed corresponding to the one of the wheels.

7. The control system of claim 6, wherein operating in calibration mode further comprises, based on results of the comparing, updating the rolling radius offset value corresponding to the one of the wheels.

8. The control system of claim 6, wherein the MCU determines for each one of the wheels an updated command speed based on the updated rolling radius offset value corresponding to the one of the wheels in combination with at least one of a tire diameter of the one of the wheels, a steered angle of the vehicle, a traction pedal command, and vehicle geometry information, and provides the determined updated command speed for the one of the wheels to the traction system corresponding to the one of the wheels.

9. The control system of claim 6, wherein the plurality of rolling radius offset values stored in the memory device are replaced with the updated rolling radius offset values when the vehicle ceases operation.

10. A vehicle comprising:

a plurality of wheels;

a master control unit (MCU);

a plurality of traction systems, wherein each of the traction systems corresponds to one of the wheels and comprises a traction motor for providing rotational force to the corresponding one of the wheels, wherein the traction motor comprises an electric motor; and a plurality of rolling radius offset values stored in a memory device accessible by the MCU, wherein each of the rolling radius offset values corresponds to one of the wheels;

wherein the MCU determines for each one of the wheels a command speed based on the rolling radius offset value corresponding to the one of the wheels in combination with at least one of a tire diameter of the one of the wheels, a steered angle of the vehicle, a traction pedal command, and vehicle geometry information, and provides the determined command speed for the one of the wheels to the traction system corresponding to the one of the wheels; and wherein each of the traction systems controls a speed of the corresponding one of the wheels based on the determined command speed for the one of the wheels received from the MCU.

11. The vehicle of claim 10, wherein each of the traction systems further comprises:

a traction control unit (TCU) for controlling a speed of the rotational force generated by the traction motor.

12. The vehicle of claim 11, wherein the MCU determines whether a set of calibration mode conditions has been met and if so, causes the vehicle to operate in a calibration mode.

13. The vehicle of claim 12, wherein the operating in the calibration mode comprises:

for each of the traction systems, comparing a traction motor current for the traction system with an average traction motor current for all of the traction systems; and based on results of the comparing:

adjusting the command speed corresponding to the one of the wheels; and updating the rolling radius offset value corresponding to the one of the wheels.

14. The vehicle of claim 13, wherein the MCU determines for each one of the wheels an updated command speed based on the updated rolling radius offset value corresponding to the one of the wheels in combination with at least one of a tire diameter of the one of the wheels, a steered angle of the vehicle, a traction pedal command, and vehicle geometry information, and provides the determined updated command speed for the one of the wheels to the traction system corresponding to the one of the wheels.

15. The vehicle of claim 10, wherein the vehicle comprises a riding lawn mower.

16. A computer-implemented method comprising:

determining for each of a plurality of wheels of a vehicle a command speed based on a rolling radius offset value corresponding to the wheel in combination with at least one of a tire diameter of the one of the wheels, a steered angle of the vehicle, a traction pedal command, and vehicle geometry information, wherein the rolling radius offset values are stored in a non-volatile memory device;

for each of the determined command speeds, providing the determined command speed to a traction system for the corresponding wheel, wherein the traction system controls a speed of the corresponding wheel in accordance with the received command speed for the corresponding the wheel;

determining whether a set of calibration mode conditions has been met; and if the set of calibration mode conditions has been met, causing the vehicle to operate in a calibration mode.

17. The computer-implemented method of claim 16, wherein the set of calibration mode conditions includes at least one of:

the vehicle driving at a consistent command speed in excess of a minimum threshold speed;

the vehicle driving in a substantially straight line;

the vehicle driving on a substantially level surface; and traction motor currents are within a predetermined range for driving on a substantially level surface.

18. The computer-implemented method of claim 16, wherein causing the vehicle to operate in the calibration mode comprises:

for each of the traction systems, comparing a traction motor current for the traction system with an average traction motor current for all of the traction systems;

based on results of the comparing, adjusting the command speed of the corresponding wheel; and based on results of the comparing, updating the rolling radius offset value of the corresponding wheel.

19. The computer-implemented method of claim 18, further comprising determining for each of the wheels an updated command speed based on the updated rolling radius offset value corresponding to the wheel in combination with at least one of a tire diameter of the wheel, a steered angle of the vehicle, a traction pedal command, and vehicle geometry information, and provides the determined updated command speed for the wheel to the traction system corresponding to the wheel.

20. The computer-implemented method of claim 18, further comprising replacing the plurality of rolling radius offset values stored in a non-volatile memory device with the updated rolling radius offset values.

* * * * *